United States Patent [19]
Young et al.

[11] Patent Number: 6,062,804
[45] Date of Patent: May 16, 2000

[54] LOAD CARRYING BODY AND EJECTOR ARRANGEMENT

[75] Inventors: Alan D. Young; Peter F. Prillinger; Chris J. Smith, all of Sunderland, United Kingdom

[73] Assignee: Caterpillar Inc., Peoria, Ill.

[21] Appl. No.: 08/916,033

[22] Filed: Aug. 21, 1997

[51] Int. Cl.[7] .................................................. B66F 3/28
[52] U.S. Cl. ........................................ 414/517; 414/519
[58] Field of Search ................................. 414/517, 513, 414/519, 525.6, 509–512, 514–516, 518

[56] References Cited

U.S. PATENT DOCUMENTS

| | | | |
|---|---|---|---|
| 2,996,202 | 8/1961 | Neyland | 214/82 |
| 3,273,728 | 9/1966 | Kelso | 414/513 |
| 3,349,931 | 10/1967 | Wagner | 214/82 |
| 3,815,764 | 6/1974 | Gilfillan et al. | 214/82 |
| 3,896,947 | 7/1975 | Pearce | 414/517 |
| 3,941,260 | 3/1976 | Fisher et al. | 214/82 |
| 3,953,170 | 4/1976 | Webb | 214/82 |
| 3,973,468 | 8/1976 | Russell, Jr. | 91/25 |
| 4,044,899 | 8/1977 | Booher | 214/82 |
| 4,071,153 | 1/1978 | Booher | 214/82 |
| 4,090,627 | 5/1978 | Teti | 414/517 X |
| 4,516,904 | 5/1985 | Simmons | 414/517 |
| 4,775,283 | 10/1988 | Krapp et al. | 414/517 X |
| 4,877,366 | 10/1989 | De Filippi | 414/517 |
| 4,941,796 | 7/1990 | De Filippi | 414/517 X |
| 4,950,122 | 8/1990 | Landsdorff | 414/517 X |
| 4,954,040 | 9/1990 | Smith et al. | 414/513 |
| 5,273,390 | 12/1993 | Crissman | 414/509 X |
| 5,456,521 | 10/1995 | Moyna | 298/1 B |
| 5,800,111 | 9/1998 | Tetz et al. | 414/513 X |
| 5,934,650 | 8/1999 | Prillinger et al. | 254/93 R |

FOREIGN PATENT DOCUMENTS

| | | | |
|---|---|---|---|
| 533763 | 5/1958 | Belgium . | |
| 0 056 928 | 8/1982 | European Pat. Off. | B65F 3/28 |
| 0065249 | 11/1982 | European Pat. Off. | B65G 65/28 |
| 0 220 936 | 6/1987 | European Pat. Off. | B65F 3/00 |
| 2722152 | 1/1996 | France | B60P 1/00 |
| 1111521 | 7/1961 | Germany . | |
| 3309931 | 8/1984 | Germany | B60P 1/00 |
| 8006176 | 6/1982 | Netherlands | 414/513 |
| 1136422 | 12/1968 | United Kingdom | B60P 1/00 |
| 2137955 | 10/1984 | United Kingdom | 414/517 |

*Primary Examiner*—Robert P. Olszewski
*Assistant Examiner*—Gerald J. O'Connor
*Attorney, Agent, or Firm*—Alan J. Hickman

[57] ABSTRACT

A load carrying body has an ejector slidably disposed for movement between first and second end portions of the load carrying body. The load carrying body has a "v" shaped floor and the ejector has a "v" shaped bottom. The ejector has a first angled portion disposed at a preselected included first angle relative to a longitudinal axis of the load carrying body. The second end portion of the load carrying body has an angled end portion at substantially the same angle as the included first angle to facilitate complete ejection. A jack pulls the ejector between the first and second end portions.

24 Claims, 8 Drawing Sheets

LOAD CARRYING BODY AND EJECTOR ARRANGEMENT

TECHNICAL FIELD

This invention relates to a machine having a load carrying body and more particularly to a load carrying machine having a load ejector disposed in the load carrying body and longitudinally movable to substantially completely eject a load from the load carrying body.

BACKGROUND ART

Load carrying machines such as those used for transporting a loose load, for example, soil, rocks, gravel, garbage and the like form one location to another have a load carrying body for carrying the load. In some load carrying machines an ejector is provided for pushing the load from the load carrying body rather than dumping the load by tipping the load carrying body.

Load carrying machines with ejectors are suited for use in different applications for different reasons. Load carrying machines with ejectors are frequently utilized in applications where completeness of unloading is desired. Ejectors are often used in applications where the load being carried tends to stick to the load carrying body or otherwise resist unloading by traditional dumping methods. Ejectors are also useful in applications where the accuracy of load placement and load spreading is an issue. Load carrying machines with an ejector are also desirable in mining applications where over head clearance is limited and a pivotal tipping dump body is not feasible for use.

Ejectors for use in load carrying machine applications are often guided for controlled movement within the load carrying body by guide mechanisms, or example, rollers and trackways. In addition to guiding the ejector, the guide mechanism also serves to maintain the ejector from undesirable movement within the load carrying body, for example, cocking and lifting. The forces of cocking and lifting applied to the guide rollers and trackways tend to increase the force required to move the ejector and results in premature guide mechanism failure. The guide mechanism is also exposed to the material carried in the load carrying body which tends to wear the guide mechanism prematurely. This wear results in early life failure and down time of the load carrying machine. The guide mechanism also occupies space and reduces the effective load carrying capacity of the load carrying body. In operation the trackways and rollers are subjected to side thrust and It would be advantageous to be able to eliminate the guide mechanism.

The ejector is normally connected to a mechanism which moves the ejector along the trackways. The mechanism is located between the ejector and the load carrying body on a side of the ejector opposite a load side of the ejector. The space required to house the mechanism is substantial and significantly reduces the load carrying capacity of the load carrying body. The space is partially increased because the size of the mechanism powering the ejector is designed to handle the forces caused by side loading and lifting. A reduction in this wasted space would provide a beneficial improvement over prior ejector arrangements.

It would be advantageous to be able to pull the ejector during movement of the ejector between first and second longitudinally spaced end portions of the load carrying body. This pulling action would promote self tracking of the ejector and eliminate the need for a guide mechanism, such as described above.

It would also be advantageous to be able to utilize the forces of the load on the ejector to maintain the ejector at a desired position relative to the floor of the load carrying body and eliminate the need for the guide mechanism to keep the ejector from lifting.

It would be beneficial to be able to lower the center of gravity of the load carrying body and at the same time increase the load carrying capacity thereof.

It would also be advantageous to provide an ejector that was capable of substantially completely ejecting all of the load from the load carrying body in a simple and efficient manner.

The subject invention is directed to overcome one or more of the problems set forth above.

DISCLOSURE OF THE INVENTION

In one aspect of the present invention, a load carrying machine has a load carrying body, an ejector and a jack. The load carrying body has a longitudinal axis, a first longitudinally extending side wall, a second longitudinally extending side wall spaced from the first longitudinally extending side wall, a floor connected to and extending between the first and second longitudinally extending side walls, a first end portion, and a second end portion longitudinally spaced from the first end portion. The ejector has a first side member, a second side member spaced from the first side member, a bottom member connected to said first and second side members, and a load pushing member connected to the bottom member and connected to and between the first and second side members. The ejector is disposed between the first and second side walls of the load carrying body, slidably supported by the floor, and moveable between the first and second end portions of the load carrying body. The jack is connected to the ejector and to the second end portion of the load carrying body. The jack is telescopically movable and the ejector is movable between the first and second end portions of the load carrying body in response to telescopic movement of said jack. The floor has an angled portion located at the second end portion of the load carrying body. The load pushing member has a first angled portion. The first angled portion of the load pushing member and the angled portion of the floor at the second end portion of the load carrying body are each at a predetermined angle relative to the longitudinal axis of the load carrying body of substantially the same magnitude.

In another aspect of the present invention, a load carrying machine has a load carrying body, an ejector and a jack. The load carrying body has a longitudinal axis, a first longitudinally extending side wall, a second longitudinally extending side wall spaced from the first longitudinally extending side wall, a floor connected to and extending between the first and second longitudinally extending side walls, a first end portion, and a second end portion longitudinally spaced from said first end portion. The ejector has a center of gravity, a first side member, a second side member spaced from the first side member, a bottom member connected to the first and second side members, and a load pushing member connected to the bottom member and connected to and between the first and second side members. The ejector is disposed between the first and second side walls of the load carrying body, slidably supported by the floor, and moveable between the first and second end portions of the load carrying body. The load pushing member has a first angled portion and a second angled portion. The first angled portion is connected to and between the second angled portion, the first and second side members, and the bottom member. The jack has a longitudinal jack axis and is connected to the load pushing member and to a first end portion of the load carrying body. The longitudinal jack axis passes substantially through the center of gravity and is telescopically movable to move the ejector along the floor between the first and second end portions of the load carrying body.

BEST MODE FOR CARRYING OUT THE INVENTION

Figure 1:
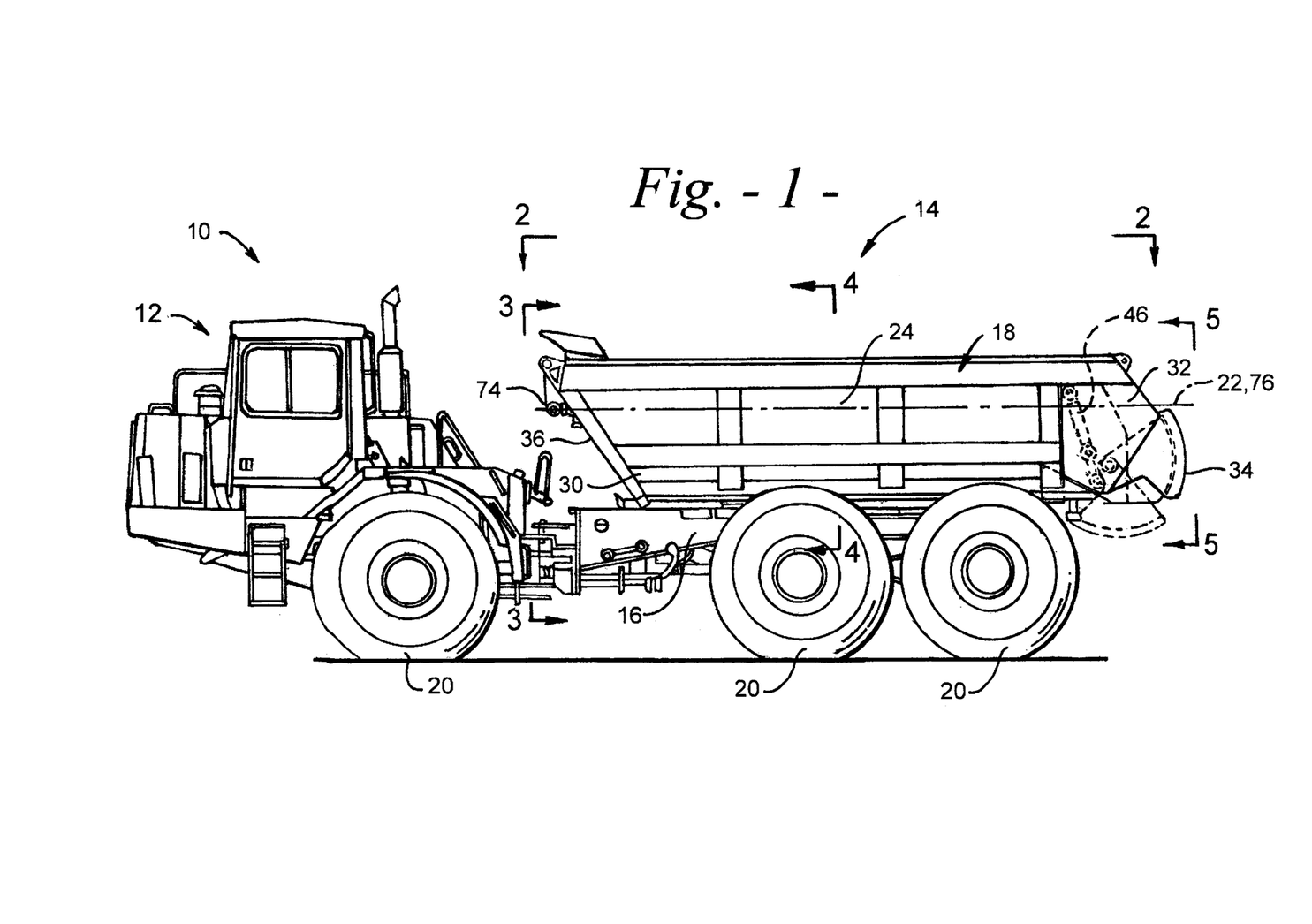
FIG. 1 is a diagrammatic side elevational view of a load carrying machine having a load carrying body and an ejector.
Figure 2:
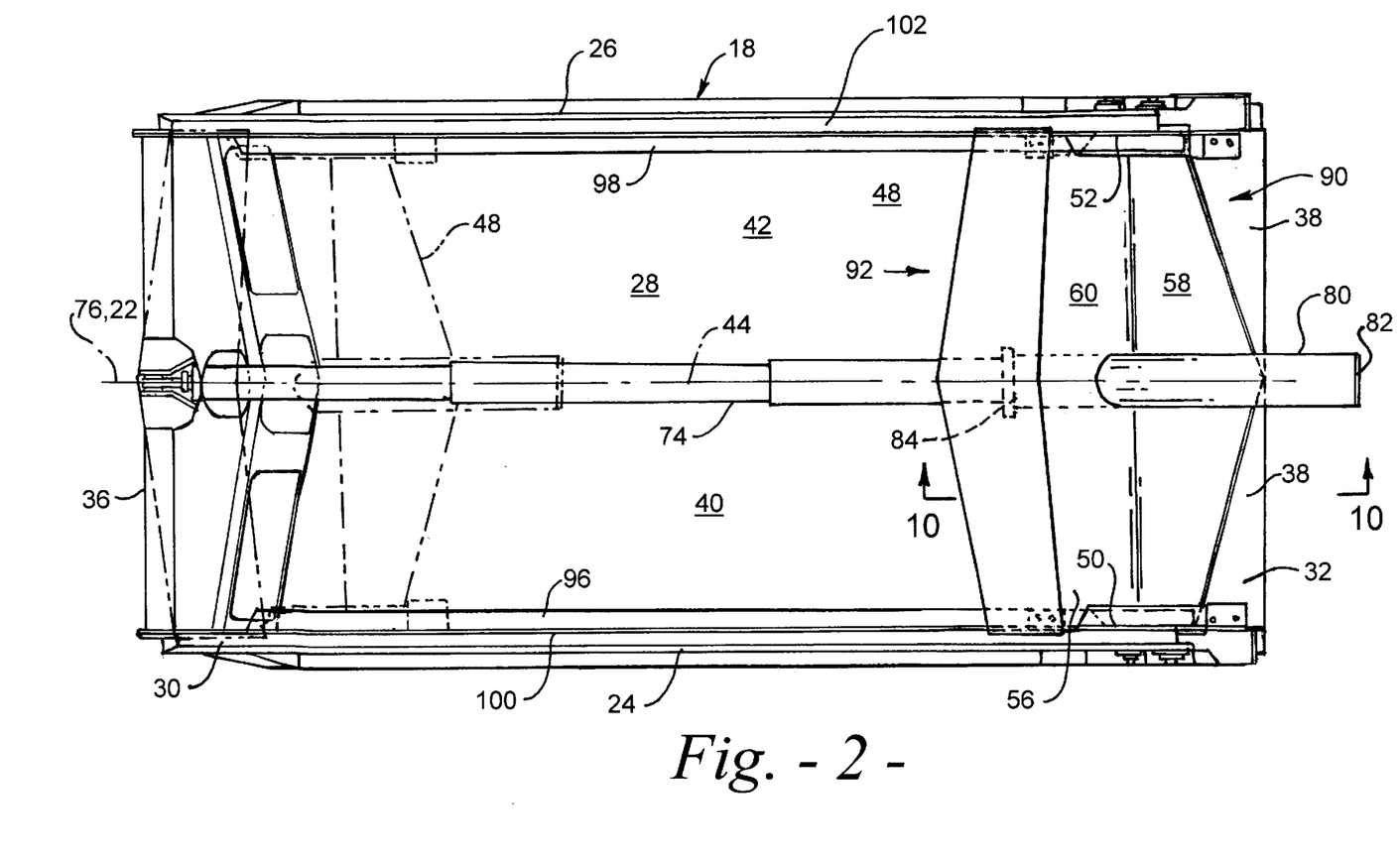
FIG. 2 is a diagrammatic top plan view of taken along lines 2—2 of FIG. 1 showing the load carrying body and ejector in greater detail.
Figure 3:
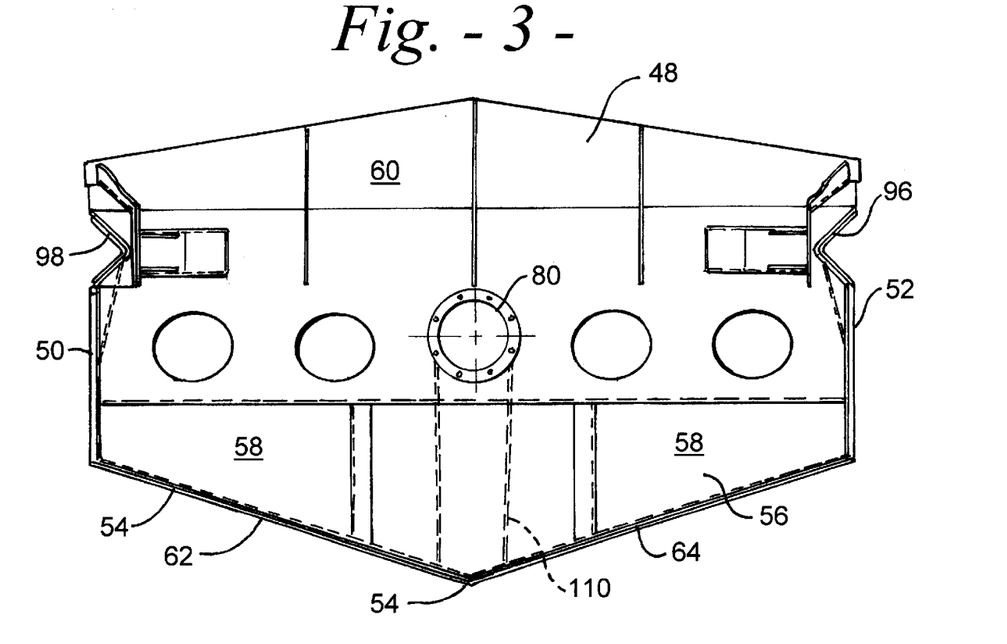
FIG. 3 is a diagrammatic end view taken along lines 3—3 of FIG. 1 showing the ejector from the second side.
Figure 4:
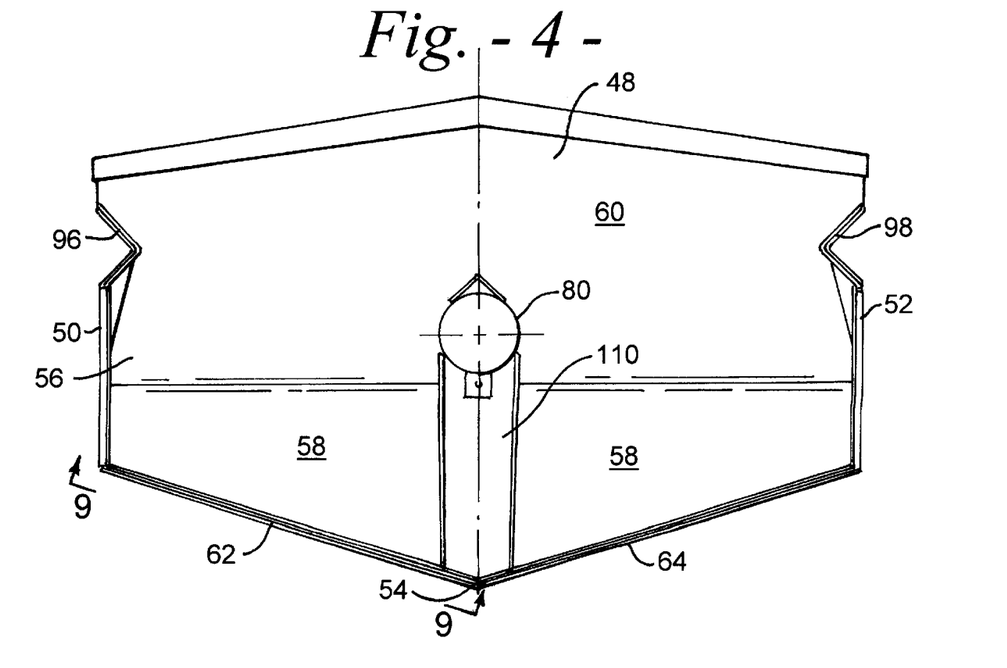
FIG. 4 is a diagrammatic view taken along lines 4—4 of FIG. 1 showing the ejector from the first side.
Figure 5:
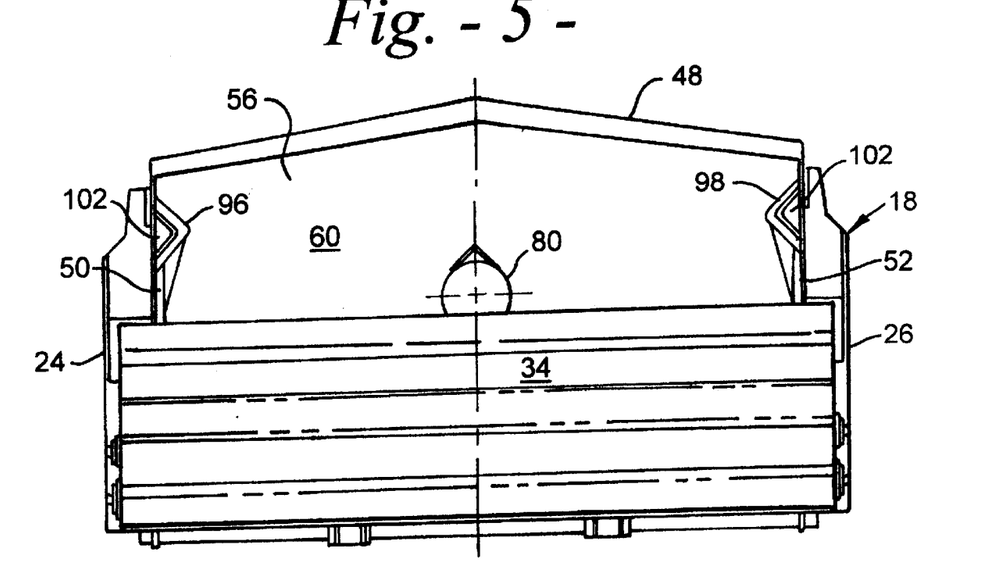
FIG. 5 is a diagrammatic end view of the second end portion of the load carrying body taken along lines 5—5 of FIG. 1 with a tailgate shown closed.

With reference to the drawings and particularly FIG. 1, load carrying machine 10, shown as an articulated steered truck, has a tractor portion 12 and a load carrying portion 14 pivotally connected to the tractor portion 12. The load carrying portion 14 has a frame 16 and a load carrying body 18 connected to the frame 16. The load carrying portion 14 and the tractor portion 12 have a plurality of ground engaging wheels 20 for traversing an underlying terrain. The tractor portion 12 has a prime mover (not shown) operatively connected to one or more of the wheels for propelling the load carrying machine over the underlying terrain.

As best seen in FIGS. 1–2 and 5–6, the load carrying body 18 has a longitudinal axis 22, a first longitudinally extending side wall 24, a second longitudinally extending side wall 26 spaced from the first longitudinally extending side wall 24, a floor 28 connected to and extending between the first and second longitudinally extending side walls 24,26, a first end portion 30, and a second end portion 32 longitudinally spaced from said first end portion 30. The above connections are made in any suitable manner, for example, by welding.

As shown in FIG. 1, the load carrying body 18 has a tailgate 34 pivotally connected to the first and second side walls 24,26 at the second end portion 32 and a fluid operated jack connected to the tailgate 34 and the load carrying body 18. The fluid operated jack 46 is selectively actuatable for pivotally moving the tailgate 34 between open and closed positions relative to the second end portion of the load carrying body 18. Such construction and operation is well known in the art and will therefore not be discussed in any greater detail.

The body has a fabricated end wall 36 connected to the first and second side walls 24,26, in any suitable manner. The end wall 36 is located at the first end portion 30, for example, shown as the forward end of the load carrying body 18 and provides sufficient strength and rigidity to maintain the side walls 24,26 preferably parallel and at a predetermined spacing. The end wall has openings disposed therein to permit debris to pass therethrough.

Referring to FIGS. 2,6,8,10 and 12, the floor 28 has an angled end portion 38 at the second end portion 32 of the body 18. The angled end portion 38 is at a preselected angle "a" (FIG. 10) relative to the to longitudinal axis 22. This preselected angle "a" is selected based on soil mechanics principles and of a magnitude sufficient to facilitate complete washing of the load material during an emptying cycle of the load carrying body 18.

Figure 6:
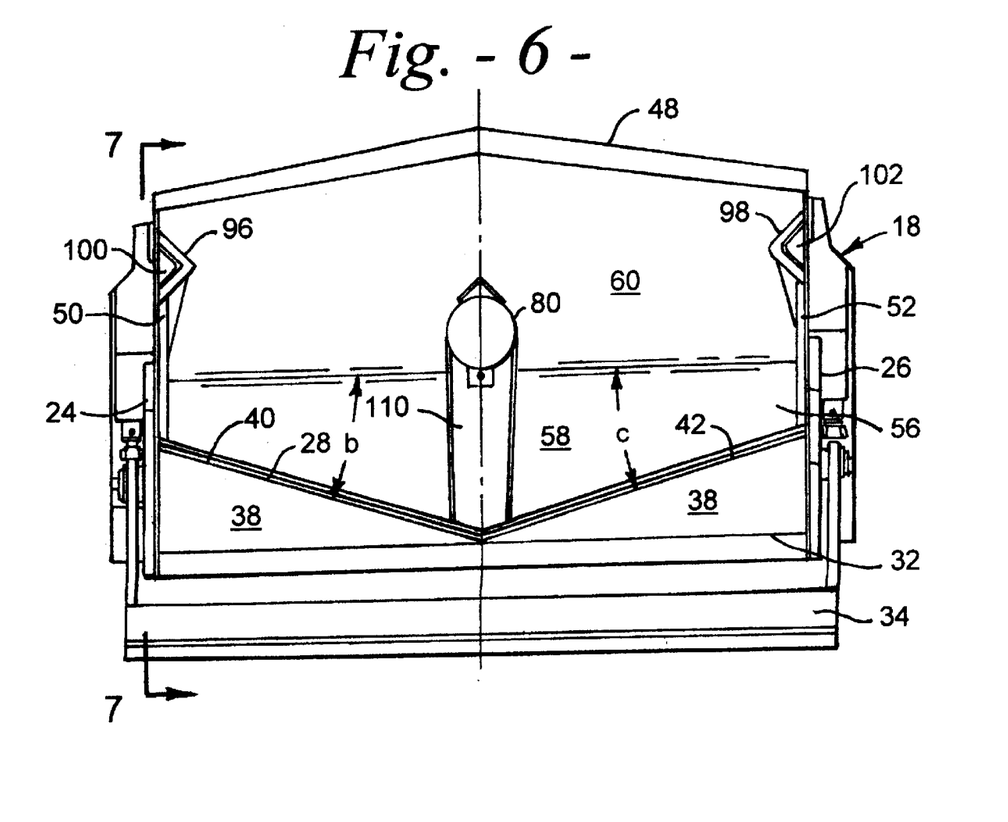
FIG. 6 is a diagrammatic end view of the second end portion of the load carrying member, like that of FIG. 5, but with the tailgate open.

As best seen in FIG. 6, the floor 28 also has first and second angled floor portions 40,42 are connected to each other along a longitudinally extending mid-line 44 of the floor 28. The first and second angled floor portions, 40,42 extend, respectively, from the mid-line 44 to the first and second side walls 24,26, respectively. The first and second angled floor portions 40,42 also extend between the first and second end portions 30,32 of the load carrying body 18. As can be seen, the first and second angled floor portions 40,42 define a "v" shape with the apex of the "v" at the mid-line 44. Having this "v" configuration maintains a lower center of gravity and a larger load carrying capacity. The magnitude of a preselected angle "b" of the first angled floor portion 40 and the magnitude of a preselected angle "c" of the second angled floor portion 42, each relative to a horizontal plane, is based on soil mechanics principles, load carrying capacity, and other structural load carrying machine limitations. The angles "b" and "c" preferably have substantially the same magnitude.

As best seen in FIGS. 2–4, and 6–12, an ejector 48 has a first side member 50, a second side member 52 spaced from the first side member 50, a bottom member 54 connected to the first and second side members 50,52, and a load pushing member 56 connected to the bottom member 54 and connected to and between the first and second side members 50,52. The ejector 48 is disposed between the first and second side walls 24,26 of the load carrying body 18, slidably supported by the floor 28, and moveable between the first and second end portions 30,32 of the load carrying body 18. The load pushing member 56 has a first angled portion 58 and a second angled portion 60. The first angled portion 58 is connected to and between the second angled portion 60 and the bottom member 54. The first angled portion 58 is also connected to and between the first and second side members 50,52. The above connections related to the ejector 48 may be made in any suitable manner, for example, by welding.

Figure 10:
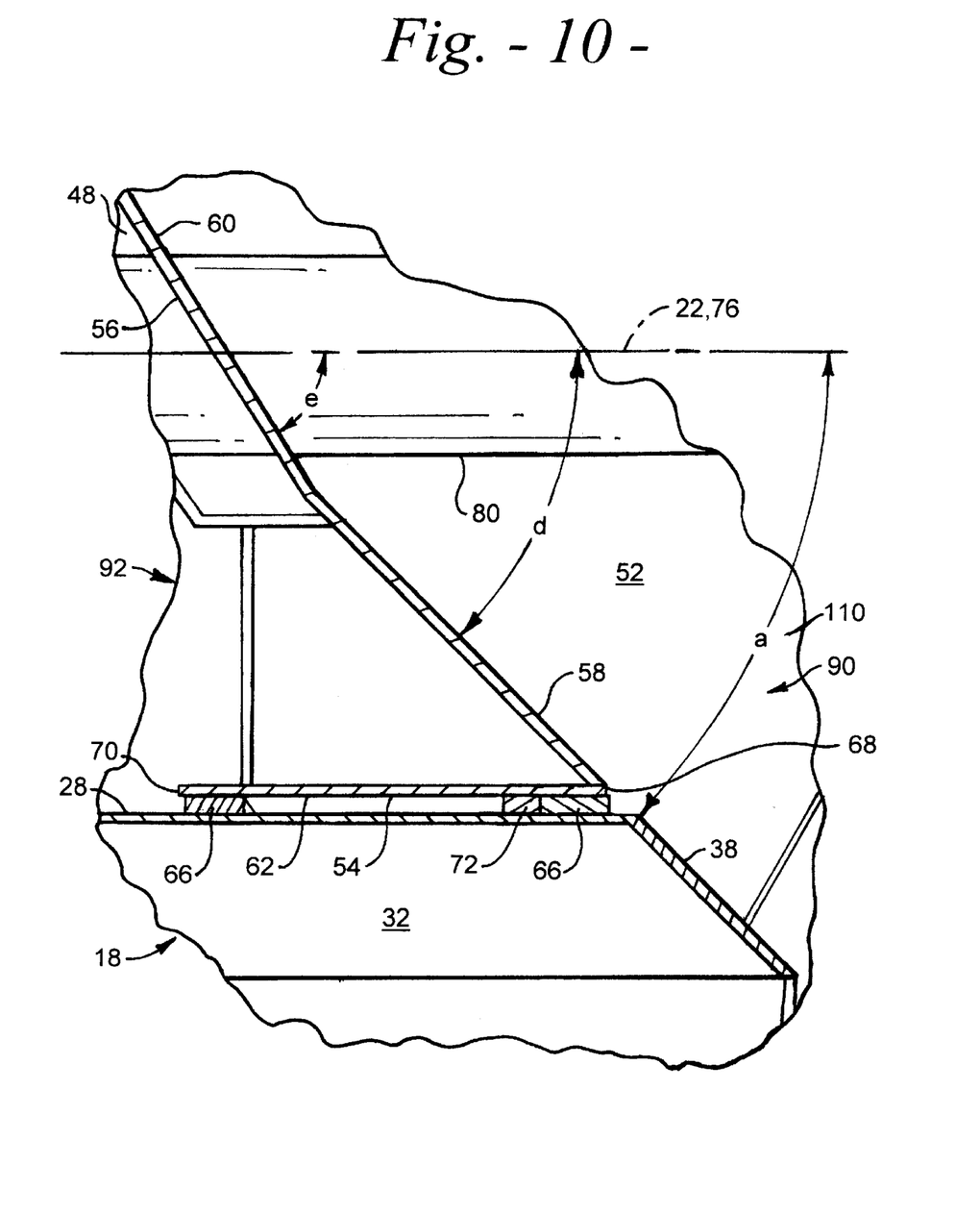
FIG. 10 is a diagrammatic cross-sectional view taken along lines 10—10 of FIG. 2 showing the ejector at the second end portion of the load carrying body and the relative angles of an angled portion of the floor at the second end portion of the load carrying body and a first angled portion of a load pushing member of the ejector.
Figure 11:
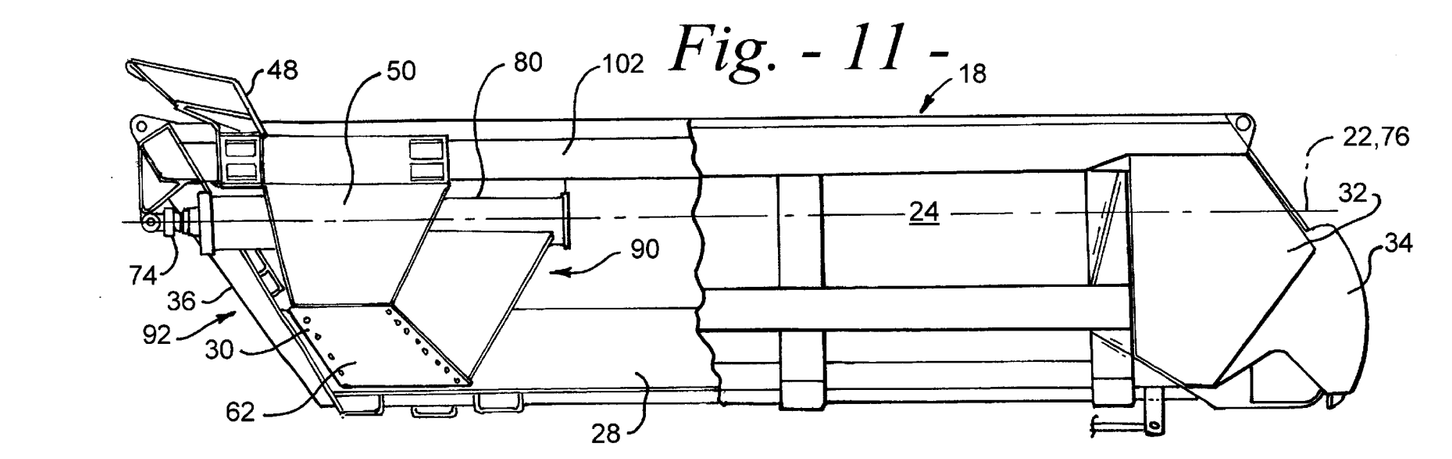
FIG. 11 is a diagrammatic side view of the load carrying body with portions broken away showing the ejector at the first end portion of the load carrying body and the tailgate closed.
Figure 12:
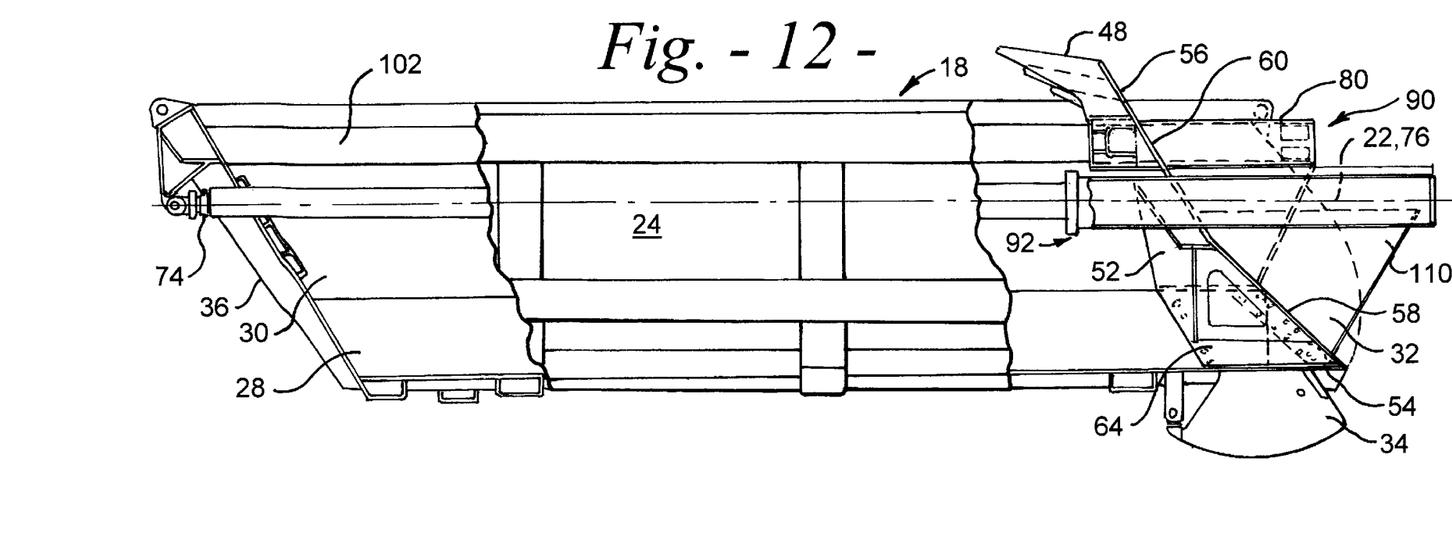
FIG. 12 is a diagrammatic side view of the load carrying body with portions broken away showing the ejector at the second end portion of the load carrying body and the tailgate open.

As best seen in FIG. 10, the first angled portion 58 of the load pushing member 56 of ejector 48 is at a first predetermined included angle "d" relative to the longitudinal axis 22 (jack axis 76). The magnitude of the angle "d" is preferably substantially equal to the magnitude of the angle "a" of angled end portion 38 as discussed above. Preferably, the angle "d" is at a nominal included angle of about 45 degrees. The second angled portion 60 is at a second predetermined included angle "e" relative to the longitudinal axis 22 (jack axis 76). The magnitude of angle "e" is different than the magnitude of angle "d". The magnitude of the second angled portion 60 of the load pushing member 56 is at a nominal included angle of about 60 degrees relative to the longitudinal axis 22. The first angle "d" is determined based soil mechanics. That is, where the scouring action of a load carried by the load carrying body 18 from the first angled portion 58 is maximized and where the load carrying capacity of the load carrying body 18 is maximized. The angle "d" is also selected to be at an angle normal to a component of maximum force of the load as determined by soil mechanics. This force acting against the first angled portion 58 is used to maintain ejector 48 in sliding contact with the floor 28 during load pushing movement and eliminate the need for massive guide ways, rollers and the like. Stated another way, the payload acts in a direction substantially normal to the first angled portion 58 and forces the ejector against the floor 28 of the load carrying member 18. It should be recognized that the second angle "e" is also selected using one or more of the above mentioned parameters.

The bottom member 54 has first and second angled bottom portions 62,64. As can be seen, the first and second angled bottom portions 62,64 define a "v" shape with the apex of the "v" extending in a longitudinal direction relative to the longitudinal extension of the load carrying portion 14. The floor 28 guides the ejector 48 for movement between the first and second end portions 30,32. This "v" configuration of the ejector 48 conforms to the "v" of the floor 28 of the load carrying body 18. Therefore, the first angled floor and bottom portions 40,62 are at substantially the same angle "b" and the second angled floor and bottom portions 42,64 are at substantially the same angle "c". This facilitates smoothness of movement of the ejector 48, and reduces the passing of load material from the first end portion 30 to the second end portion 32.

Figure 7:
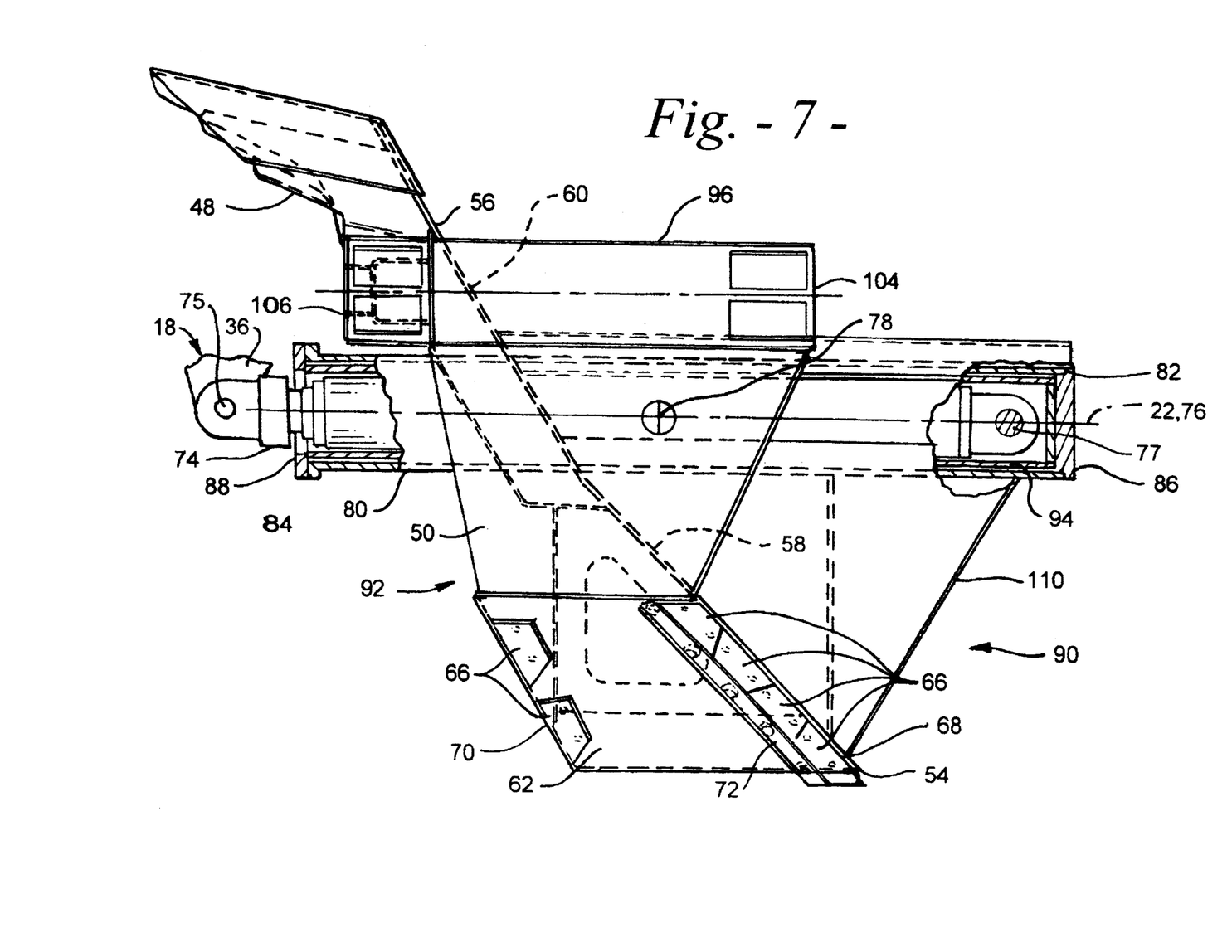
FIG. 7 is a diagrammatic view taken along lines 7—7 of FIG. 6 showing the ejector and a jack for moving the ejector in substantial detail.
Figure 9:
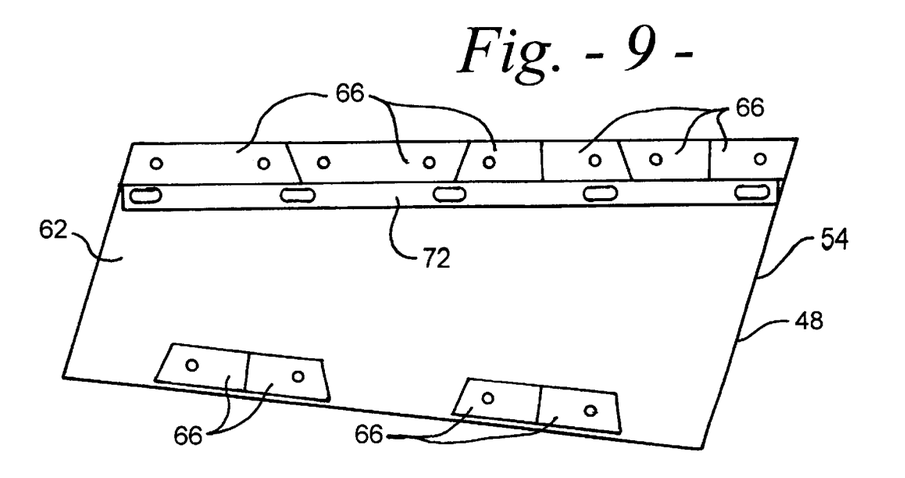
FIG. 9 is a diagrammatic view taken along lines 9—9 of FIG. 4 showing the location of bearing blocks mounted on a bottom of the ejector.

Referring to FIGS. 7 and 9, a plurality of bearing block members 66 are connected by a plurality of fasteners to the first and second angled bottom portions 62,64 and are engaged with the first and second angled floor portions 40,42. The plurality of bearing block members 66 are located in two rows, one row being adjacent a leading edge 68 of the bottom member 54 and the other row being adjacent a trailing edge 70 of the bottom member 54. The row of bearing block members 66 adjacent the leading edge 68 are sequentially abutting, as shown, and resists the passing of load material thereby. The row of bearing block members 66 adjacent the trailing edge 70 are spaced apart, as shown, so as to allow the passing of any debris that managed to pass the abutted bearing block members 66 adjacent the leading edge 68. An abutment strip 72 connected to the bottom member 54, by welding or any other suitable fastening technique, at a location between the leading and trailing edges 68,70 is engaged with the plurality of bearing block members 66 adjacent the leading edge 68. The abutment strip 72 backs up the bearing block members 66 and maintains the bearing block members 66 from moving toward the trailing edge 70.

Referring to FIGS. 2,7,11 and 12, a jack 74, preferably a multiple-tube telescopic fluid operated jack, is pivotally connected between the ejector 48 and the first end portion 30 (end wall 36) of the load carrying body 18 by a pair of pivot pins 75,77. In particular, the jack 74 has a longitudinal jack axis 76 and is telescopically movable. The longitudinal jack axis 76 and the longitudinal axis 22 are substantially parallel and preferably coincident. The ejector 48 is movable along the floor 28 between the first and second end portions 30,32 of the load carrying body 18 in response to telescopic movement of the jack 74. The first angled portion 58 of the load pushing member 56 and the angled end portion 38 of the floor 28 are substantially aligned when the jack is extended so that the load being pushed by the ejector 48 is completely ejected from the load carrying body 18.

The ejector 48 has a center of gravity 78 and the longitudinal jack axis 76 passes substantially through the center of gravity 78. The center of gravity 78 of the ejector 48 is located above a location of the juncture of connection between the first and second angled portions 58,60 of the load pushing member 56. Stated another way the juncture of connection is located beneath the center of gravity 78. Preferably, the center of gravity 78 lies along the longitudinal jack axis 76. The center of gravity 78 is also disposed midway between the first and second side members 50,52.

The load carrying body 18 has a preselected payload (load) center of mass based on machine parameters and load carrying body 18 dimensions. Preferably, the payload center of mass lies substantially along the longitudinal axis 22 of the load carrying body 18 and also the longitudinal jack axis 76.

The ejector 48 includes an elongated cylindrical tube member 80 connected to the load pushing member 56. The tube member 80 extends substantially coincident with the jack axis 76 and has first and second opposite ends 82,84. A first flange 86 is connected to the first end 82 and a second flange 88 is connected to the second end 84. The connection is made in any suitable manner, such as by threaded fasteners (not shown). The first flange 86 is located on a first side 90 of the load pushing member 56 (the side toward the first end portion 30) and the second flange 88 is located on a second side 92 of the load pushing member 56 (the side toward the second end portion 32). The jack 74 is axially disposed in the tube member 80. The first flange 86 is engaged to pull the ejector 48 toward the second end portion 32 of the load carrying body 18 in response to extension of the jack 74. The second flange 88 is engaged to pull the ejector 48 toward the first end portion 30 of the load carrying body 18 in response to retraction of the jack 74.

A second elongated cylindrical tube member 94 is disposed in the first tube member 80. The jack 74 is pivotally connected to the second tube member 94 by the pivot pin 77. The first flange 86 is engaged by the second tube member 94 in response to extension of the jack 74 and the second flange 88 is engaged by the second tube member 94 in response to retraction of the jack 74.

As best seen in FIGS. 5–8, a first "v" shaped ejector flange 96 is connected to the first side member 50 of the ejector 48 and a second "v" shaped ejector flange 98 is connected to the second side member 52 of the ejector 48. A first "v" shaped body flange 100 is connected to the first side wall 24 of the load carrying body 18 and a second "v" shaped body flange 102 is connected to the second side wall 26 of the load carrying body 18. The first "v" shaped ejector flange 96 is slidably engaged with the first "v" shaped body flange 100 and the second "v" shaped ejector flange 98 is slidably engaged with the second "v" shaped body flange 102. The first and second "v" shaped flanges 96,98,100,102 are elongated and extend longitudinally (preferably parallel) to the longitudinal axis 22 and the longitudinal movement of the ejector 48 along the body 18.

The first and second "v" shaped ejector flanges 96,98 each have a first and a second spaced end portions 104,106. A pair of bearing blocks 108 is connected to each of the first and second "v" shaped ejector flanges 96,98 at the first and second end portions 104,106 thereof. The bearing blocks 108 are disposed between the "v" shaped ejector flanges 96,98 and the "v" shaped load carrying body flanges 100, 102. The flanges 96,98,100,102 and the bearing blocks 108 provide smooth operation of the ejector 48 and guide the ejector 48 during longitudinal movement along the load carrying body 18.

Figure 8:
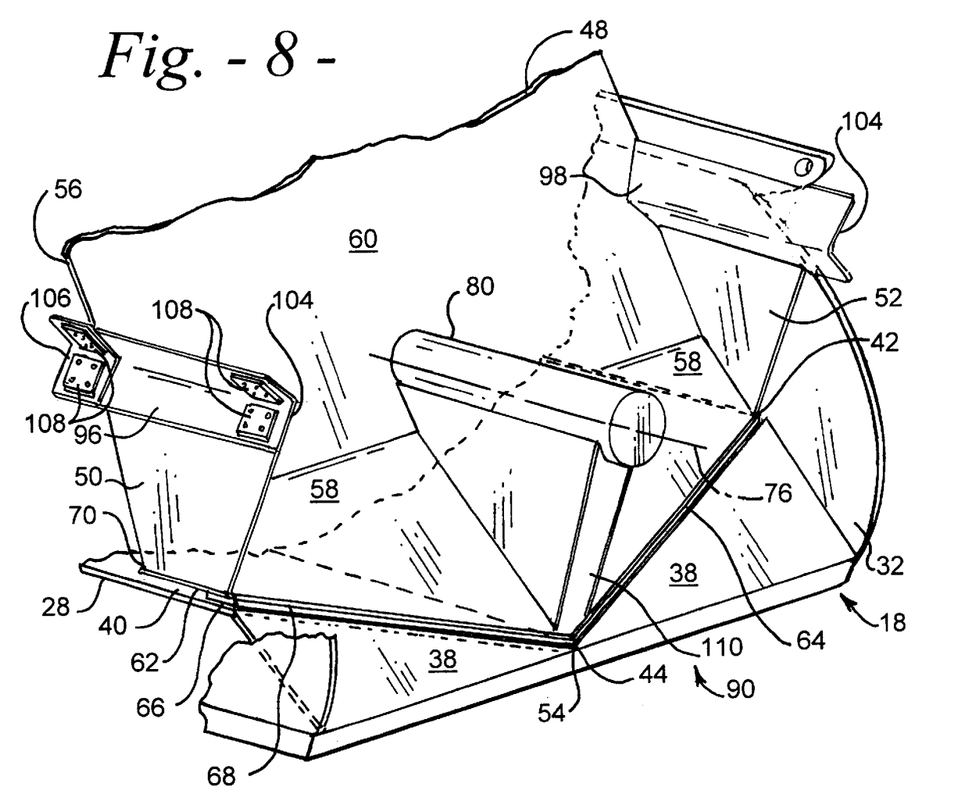
FIG. 8 is a diagrammatic isometric view showing a portion of the body and the ejector at the second end portion of the body.

As best seen in FIGS. 7 and 8, a gusset arrangement 110 is connected to the cylindrical tube member 80 and the load pushing member 56 of the ejector 48 and maintains the cylindrical tube member 80 at the proper orientation relative to the longitudinal axis 22. This orientation is substantially axially aligned with the longitudinal axis 22.

INDUSTRIAL APPLICABILITY

With reference to the drawings, and in operation, extension of the jack 74 causes the ejector 48 to be pulled by the first flange 86 toward the second end portion 32 of the load carrying body 18 and eject the load carried by the load carrying body 18 from the body 18. Because the first and second angled portions 58,60 of the load pushing member 56 are at the aforementioned preselected first and second angles "d" and "e" the load freely flows along the surface of the load pushing member 56 and out of the load carrying body 18.

Because the ejector 48 is pulled by the jack 74 during extension from the first side 90 of the ejector 48, the ejector 48 is self tracking and self centering. This tends to cause automatic position correction and does away with the need for a massive and extremely rugged guide structure.

The "v" shape of the floor 28 increases the capacity of the load carrying body 18 and lowers the center of gravity to provide for additional machine stability. This shape also aids in the self centering of the ejector 48 as the first and second angled floor portions 40,42 are substantially matched to the first and second angled portions 58,60 of the ejector 48. This further eliminates the need for a heavy guide structure.

As the ejector 48 reaches the second end portion 32 of the load carrying body 18 the angled end portion 38 of the floor 28 being substantially identical to the first angled portion 58 of the load pushing member 56 facilitates free flowing of the load from the load carrying body 18 and complete emptying of the load therefrom.

The metallic bearing block members 66 as arranged and attached to the bottom member 54 of the ejector 48 provides for smooth sliding of the ejector along the floor 28 and inhibits load material from passing between the ejector 48 and the load carrying body 18. The bearing block members 66 also reduce wear of the floor 28 and ejector 48 and extend the life thereof.

The tail gate 34 being pivoted downward and completely out of the way of the open second end portion 32 of the load carrying body 18 facilitates complete and accurate load ejection from the load carrying body 18.

As the first angled portion 58 of the load pushing member 56 moves the load, the force of the load acting on the first angled portion 58 is adequate to maintain the ejector 48 in engagement with the floor 28 of the load carrying body 18 and further eliminate the need for heavily constructed guide members.

Retraction of the jack 74 returns the ejector 48 to the first end portion 30 of the load carrying body 18 by engaging the second flange 88 and pulling the ejector 48. This action facilitates self ejector 48 tracking in the manner described above. Since there is no load maintaining the ejector 48 against the floor 28 the first and second "v" shaped ejector and body flanges 96,98,100,102 ensure that the ejector is maintained from elevational lifting movement.

Other objects, advantages of the present invention may be maintained by a reading of the specification, the drawings and the appended claims.

What is claimed is:

1. A load carrying machine; comprising:

a load carrying body having a longitudinal axis, a first longitudinally extending side wall, a second longitudinally extending side wall spaced from the first longitudinally extending side wall, a floor having first and second angled floor portions defining a "v" shape, and being connected to and extending between the first and second longitudinally extending side walls, said load carrying body having a first end portion, and a second end portion longitudinally spaced from said first end portion;

an ejector having a first side member, a second side member spaced from the first side member, a bottom member connected to said first and second side members, and a load pushing member connected to the bottom member and connected to and between the first and second side members, said bottom member having first and second angled bottom portions defining a "v" shape, said ejector being disposed between the first and second side walls of the load carrying body, slidably supported by the floor, and moveable between the first and second end portions of the load carrying body;

a jack connected to the ejector and to the first end portion of the load carrying body, said jack being telescopically movable and said ejector being movable between said first and second end portions of the load carrying body in response to telescopic movement of said jack, said floor having an angled end portion located at the second end portion of the load carrying body, said load pushing member having a first angled portion, said first angled portion of the load pushing member being at a predetermined angle ("d") relative to the longitudinal axis of the load carrying body and said angled end portion of the floor at the second end portion of the load carrying body being at a predetermined angle ("a") relative to the longitudinal axis of the load carrying body, said predetermined angles ("d" and "a") being of substantially the same magnitude and in a range of about 45 degrees.

2. The load carrying machine, as set forth in claim 1, wherein said first angled floor and bottom portions each being at a predetermined angle ("b") of substantially the same magnitude relative to a horizontal plane and said second angled floor and bottom portions each being at predetermined angle ("c") of substantially the same magnitude relative to the horizontal plane.

3. The load carrying machine, as set forth in claim 2, including a plurality of bearing members connected to said first and second angled bottom portions, said bearing members being engaged with the first and second angled floor portions.

4. The load carrying machine, as set forth in claim 2, wherein said ejector having a center of gravity, said load pushing member having a second angled portion connected to the first and second side members of the ejector and to the first angled portion of the load pushing member, said center of gravity of the ejector being located above a location of connection between the first and second angled portions of the load pushing member.

5. The load carrying machine, as set forth in claim 4, wherein the first angled portion of the load pushing member being at a predetermined angle normal to a maximum load force applied to the first angled portion by a load carried by the load carrying body.

6. The load carrying machine, as set forth in claim 5, wherein the jack having a longitudinal jack axis passing substantially through the center of gravity of the ejector.

7. The load carrying machine, as set forth in claim 6, wherein the longitudinal jack axis and the longitudinal load carrying body axis being substantially parallel.

8. The load carrying machine, as set forth in claim 7, wherein the magnitude of the second angled portion of the load pushing member being at an included angle ("e") of about 60 degrees relative to the longitudinal jack axis.

9. The load carrying machine, as set forth in claim 6, including:
    a first elongated cylindrical tube member connected to the load pushing member,
    a first flange connected to the first elongated cylindrical tube member, said first flange being located on a first side of said load pushing member; and
    a second flange connected to the first elongated cylindrical tube member at a preselected location spaced from the first flange on a second side of the load pushing member, said jack being disposed within the first elongated cylindrical tube member, said first flange pulling the ejector toward the first end portion of the load carrying body in response to extension of the jack and said second flange pulling the ejector toward the second end portion of the load carrying body in response to retraction of the jack.

10. The load carrying machine, as set forth in claim 9, including a second elongated cylindrical tube member disposed in the first elongated cylindrical tube member, said jack being connected to the second elongated cylindrical tube member, said first flange being engaged by the second elongated cylindrical tube member in response to extension of the jack and said second flange being engaged by the second elongated cylindrical tube member in response to retraction of the jack.

11. The load carrying machine, as set forth in claim 4, wherein said center of gravity of the ejector being located between the first and second side members of the ejector.

12. The load carrying machine, as set forth in claim 4, wherein said bottom member having a leading edge and a trailing edge, said plurality of bearing members being located adjacent to the leading and trailing edges.

13. The load carrying machine, as set forth in claim 12, including an abutment strip connected to the bottom member at a location between the leading and trailing edges and engaged with the plurality of bearing members adjacent the leading edge, said abutment strip maintaining said bearing members from movement toward the trailing edge.

14. The load carrying machine, as set forth in claim 13, wherein said plurality of bearing members adjacent the leading edge sequentially abutting an adjacent one of the bearing members.

15. A load carrying machine, comprising:
    a load carrying body having a longitudinal axis, a first longitudinally extending side wall, a second longitudinally extending side wall spaced from the first longitudinally extending side wall, a floor having first and second angled floor portions defining a "v" shape and being connected to and extending between the first and second longitudinally extending side walls, said load carrying body having a first end portion, and a second end portion longitudinally spaced from said first end portion;
    an ejector having a center of gravity, a first side member, a second side member spaced from the first side member, a bottom member connected to said first and second side members, and a load pushing member connected to the bottom member and connected to and between the first and second side members, said bottom member having first and second angled bottom portions defining a "v" shape, said ejector being disposed between the first and second side walls of the load carrying body, slidably supported by the floor, and moveable between first and second end portions of the load carrying body, said load pushing member having a first angled portion and a second angled portion, said first angled portion being connected to and between the second angled portion and the bottom member and connected to and between the first and second side members;
    a jack having a longitudinal jack axis and being connected to said load pushing member and to a first end portion of the load carrying body, said first angled portion of the load pushing member having a juncture of connection with the second angled portion of the load pushing member at a location beneath the center of gravity of the ejector, said longitudinal jack axis passing substantially through the center of gravity and being telescopically movable to move said ejector along the floor between the first and second end portions of the load carrying body.

16. The load carrying machine, as set forth in claim 15, wherein said load carrying body having a preselected payload center of mass lying substantially along the longitudinal axis of the load carrying body, said longitudinal jack axis lying substantially along said longitudinal axis of the load carrying body.

17. The load carrying machine, as set forth in claim 15, wherein the longitudinal jack axis being located midway between the first and second side members.

18. The load carrying machine, as set forth in claim 17, wherein said load pushing member having opposed sides, said ejector having a first elongated cylindrical tube and first and second spaced flanges connected to the first elongated cylindrical tube, said first elongate cylindrical tube being concentrically disposed about said jack and said first and second flanges being located on said opposed sides, said first flange being engaged in response to an extension of said jack and said second flange being engaged in response to retraction of said jack, said first flange pulling said load pushing member toward said load carrying body first end and said second flange pulling said load pushing member toward said load carrying body second end.

19. The load carrying machine, as set forth in claim 18, wherein said center of gravity of the ejector lies along said jack axis midway between the first and second flanges.

20. The load carrying machine, as set forth in claim 19, wherein said ejector includes a second elongated cylindrical tube disposed within said first elongated cylindrical tube, said jack being connected to said second elongated cylindrical tube, said second elongated cylindrical tube being engaged with the first flange in response to extension of the jack and engaged with the second tube in response to retraction of the jack.

21. The load carrying machine, as set forth in claim 15, wherein the first angled portion of the load pushing member being at a first preselected included angle relative to the longitudinal jack axis and said second angled portion of the load pushing member being at a second preselected included angle relative to the longitudinal jack axis, said first and second included angles having different magnitudes.

22. The load carrying machine, as set forth in claim 21, wherein the magnitude of the first preselected included angle being nominally 45 degrees.

23. The load carrying machine, as set forth in claim 22, wherein the magnitude of the second preselected included angle being nominally 60 degrees.

24. The load carrying machine, as set forth in claim 21, wherein a payload carried by the load carrying body acts in a direction substantially normal to the first angled portion and forces the ejector against the floor of the load carrying member.

\* \* \* \* \*